May 18, 1926.
W. L. BASS
1,585,524
CONVERTIBLE LIQUID CONTAINER
Filed March 22, 1926
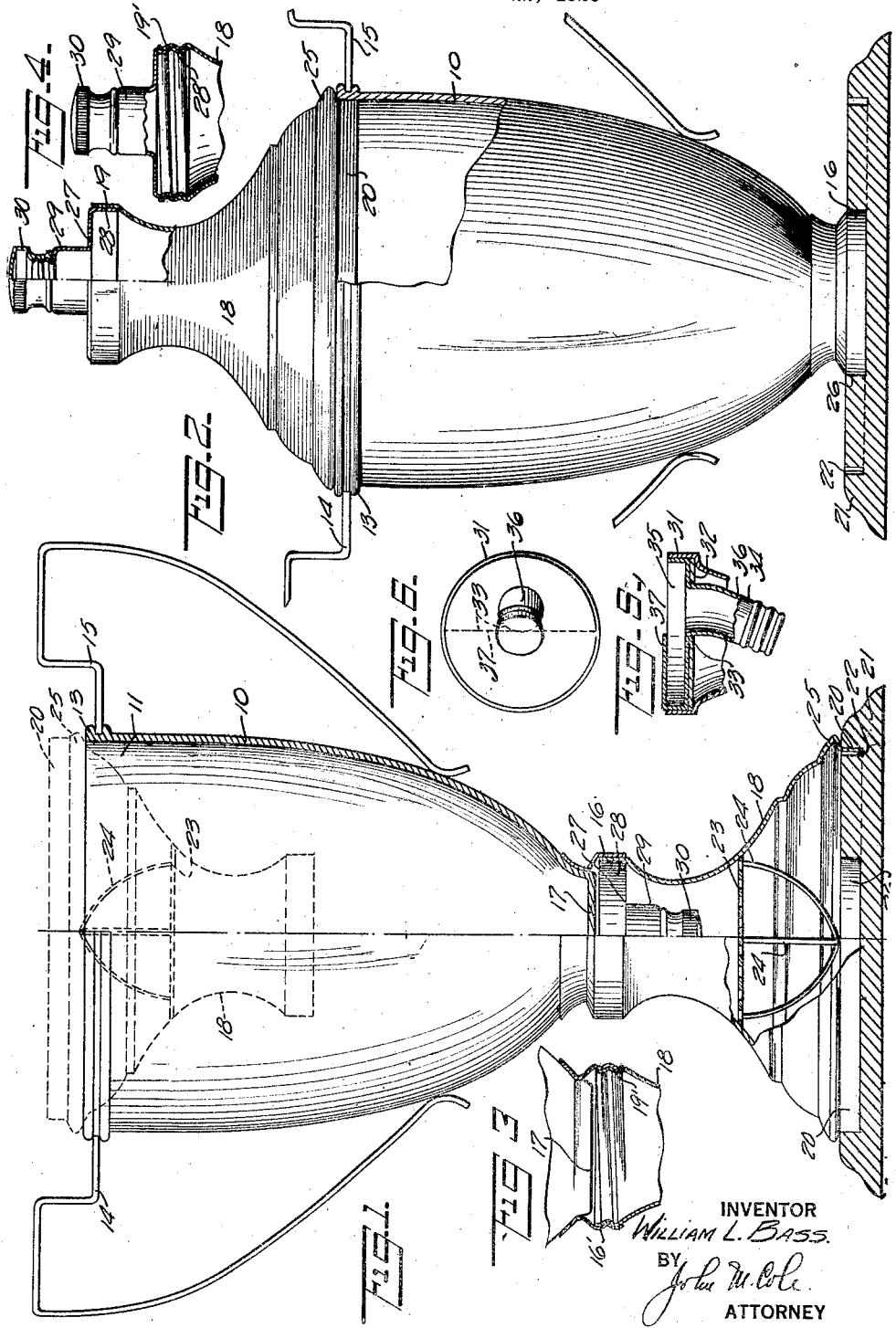
INVENTOR
WILLIAM L. BASS.
BY
ATTORNEY Patented May 18, 1926.

1,585,524

UNITED STATES PATENT OFFICE.

WILLIAM L. BASS, OF NEW YORK, N. Y.

CONVERTIBLE LIQUID CONTAINER.

Application filed March 22, 1926. Serial No. 96,630.

The present invention relates to convertible liquid containers and is more particularly directed toward a convertible container which may be made up in the form of a loving cup, water pitcher, chalice, vase, or similar article, and converted at will to a fruit juice extractor or a beverage shaker.

The present invention contemplates the provision of an article, which appears as a loving cup (or as any of the above enumerated articles), and may function as such, either for decorative purposes or for the ordinary functional uses, when the parts are in one position, and having parts which may be moved to other positions to convert the article into a fruit juice extractor or beverage shaker, when desired.

According to the present invention, these movable parts are held concealed, or are so mounted that the conversion of the device, or its suitability for use as a beverage shaker, is not obvious from a cursory examination of the article when the parts are in their normal position.

Other and further objects of the invention will be pointed out as the description proceeds.

The accompanying drawings show, for purposes of illustrating the invention, one of the many possible embodiments in which it may take form, together with modifications of certain parts.

In these drawings:

Figure 1 is a sectional view through a loving cup made up to embody the present invention, parts being broken away to show the interior, and showing in dotted lines the position of certain parts when the invention is used for extracting fruit juices;

Figure 2 is an elevational view of a beverage shaker utilizing the parts shown as in Figure 1 as being assembled in the form of a loving cup;

Figures 3 and 4 are fragmentary sectional views illustrating a portion of the construction utilizing screw threaded joints instead of a slip joint; and Figures 5 and 6 are sectional and top plan views, respectively, of a modified form of pouring spout.

As shown in the drawings the device is made up in the form of a loving cup having a cup-shaped sheet metal receptacle 10 of suitable size and configuration to make the device appear as a loving cup. This receptacle is open at the top, as indicated at 11 and a reinforcing band 13 may be employed if desired, so as to ornament the edge of the cup. Handles 14 and 15 may be attached to the top of the cup and to the lower side walls in the usual manner. The lower end of the cup is provided with a short tubular sheet metal skirt 16 which extends a short distance below the bottom 17 of the cup-shaped receptacle.

A base member 18 of suitable size and shape is provided to make the device appear as a loving cup when the cup-shaped receptacle 10 is placed on top of this base member. As shown in Figure 1, the upper end 19 of this base member is tubular and adapted to telescopically fit the skirt 16 carried by the cup. The base member may be made in an ornamental shape as is customary in the art, if desired, and the lower end is preferably provided with a skirt 20 which has the same outside diameter as the inside diameter of the open end of the cup. A wooden disc 21 is also provided to finish off the lower end of the device so that there will be no tendency to scratch or mar furniture on which the loving cup is to be placed. This wooden base is preferably grooved as shown at 22, to receive the skirt 20 on the metal base member, the fit being fairly tight so that there is little likelihood of the wooden base accidently falling off the metal base member.

The device so far described will appear as an ordinary loving cup, but according to the present invention additional elements are provided which permit the loving cup to be used for extracting fruit juices or for a beverage shaker.

A strainer 23 is fastened across an intermediate portion of the base member as indicated, and a fruit juice extractor or lemon squeezer 24 is attached to the strainer or to the metal base member, as desired. When the tubular part 19 of the base member is slipped out of the skirt 16 of the cup and the base 18 separated from the wooden plate 21, the base member 18 may be inverted and placed in the position indicated in dotted lines in the upper part of Figure 1. The bead 25 on the base member, will rest on the upper edge of the cup and the fruit squeezer 24 will be on top so that one may readily press the fruit against the fruit squeezer and extract the juice, allowing it to pass through the strainer and drain into the cup. At this time, the skirt 16 on the cup may be placed in a recess 26 in the wooden base 21.

A stopper member 27 may be inverted and placed inside the upper part of the base member 18, as indicated. As shown in Figures 1 and 2, this stopper member has a skirt 28 which slides down inside of the tubular portion 19 carried by the base 18. The stopper member is also provided with a spout 29 and a removable cap 30.

When it is desired to use the device as a beverage shaker, the base 18 is separated from the cup-shaped member 10, the cup-shaped member is placed on the wooden disc 21, as indicated in Figure 2, and the base member is placed on top of the cup so as to provide a cover for the cup. The skirt 20 of the base member fits tightly inside the upper portion of the cup. The stopper member 27 is removed from the inside of the base member, inverted and placed inside the tubular portion 19 of the base member, as indicated at the top of Figure 2. When the cap 30 is removed, the beverage may be poured from the inside of the cup through the spout 29, the strainer 23 acting to prevent the escape of seeds, ice or other solid material.

Instead of making the skirt and upper portion of the base 19 smooth, as indicated in Figures 1 and 2, it is of course possible to make them threaded, as indicated at 16' and 19' in Figure 3. In this case, the skirt 28' of the stopper member may be also threaded so as to thread inside the threaded portion 19'.

According to the modified form of stopper, shown in Figures 5 and 6, the upper end 31 of the base member 18 is provided with a partition 32 which may be removable or permanent, as desired. The partition is provided with a hole 33 which is off center. A stopper member 34 has a skirt 35 which is slipped down inside the tubular portion 31 and has a spout 36 which will pass through the hole 33. A web 37 is carried on the opposite side of the stopper member so that the hole 33 in the web 32 may be closed when the stopper member is inverted and reinserted as indicated in Figure 6. When the stopper member is turned part way around the passage is opened so that the contents of the shaker may be poured through the spout 36.

From the foregoing, it will be obvious that there has been provided a simple construction which would appear as a loving cup when the parts are in the position of Figure 1, and that the device may be used as a fruit juice extractor or as a beverage shaker when moved to other positions above described. The usefulness of the device as a fruit juice extractor or a beverage shaker is entirely inobvious when the device is assembled to appear as a loving cup. While the embodiment of the invention herein illustrated contemplates a convertible loving cup, it is of course obvious that the invention may be applied to other articles having a cup-shaped receptacle and a base such, for example, as a water pitcher, chalice, or vase.

It is obvious that the invention may be embodied in many forms and constructions, and I wish it to be understood that the particular forms shown are but a few of the many forms. Various modifications and changes being possible, I do not limit myself in any way with respect thereto.

What is claimed is:

1. In a container of the class described, for preparing mixed beverages, a cup shaped liquid receptacle, a hollow base therefor, said base being detachably connected with the lower part of the receptacle and having a size and shape to permit it to act as a cover for the receptacle, said base having an opening and carrying a closure member movable into a position to act as a stopper for said opening when the base is functioning as a cover.

2. In a container of the class described, for preparing mixed beverages, a cup shaped liquid receptacle, a hollow base therefor, said base being detachably connected with the lower part of the receptacle and having a size and shape to permit it to act as a cover for the receptacle, said base having an opening and carrying a closure member movable into a position to act as a stopper for said opening when the base is functioning as a cover, and also carrying a strainer between the top and bottom of the base.

3. In a container of the class described, for preparing mixed beverages, a cup shaped liquid receptacle, a frustro-conical sheet metal base therefor, said base being detachably connected with the lower part of the receptacle and having a size and shape to permit it to act as a cover for the receptacle, said base having an opening and carrying a closure member movable into a position to act as a stopper for said opening when the base is functioning as a cover, and also carrying a strainer between the top and bottom of the base.

4. In a container of the class described, for preparing mixed beverages, a cup shaped liquid receptacle having a closed bottom, a hollow supporting base of frustro-conical shape, provided with an opening at its upper end, and detachably connected with the bottom of the receptacle, said base being of such size and shape to permit it to act as a cover for the receptacle, a strainer transversely disposed across the inside of the base, and a hollow stopper member carried between the strainer member and the upper end of the base when the base is supporting the receptacle and movable to close the upper open end of the base when it is acting as a cover, said stopper member then providing a pouring spout.

5. In a container of the class described, for preparing mixed beverages, a cup shaped liquid receptacle having a closed bottom, a hollow supporting base of frustro-conical shape, provided with an opening at its upper end, and having a quick detachable frictional connection with the bottom of the receptacle, said base being of such size and shape to permit it to act as a cover for the receptacle, a strainer transversely disposed across the inside of the base, and a hollow stopper member carried between the strainer member and the upper end of the base when the base is supporting the receptacle and movable to close the upper open end of the base when it is acting as a cover, said stopper member then providing a pouring spout, said stopper member being frictionally held in either position.

6. In a container of the class described, a hollow frustro-conical base having a tubular upper end, a strainer interiorly disposed transversely of the base, a fruit squeezer carried inside the base below the strainer, and a cup shaped receptacle detachably carried by the tubular upper end of the base, the base being capable of being inverted and placed on top of the receptacle so that juice expressed by the squeezer may drain through the strainer into the receptacle.

7. In a container of the class described, a hollow frustro-conical base having a tubular upper end, a strainer interiorly disposed transversely of the base, a fruit squeezer carried inside the base below the strainer, and a cup shaped receptacle detachably carried by the tubular upper end of the base, the base being capable of being inverted and placed on top of the receptacle so that juice expressed by the squeezer may drain through the strainer into the receptacle, the base also having a size and shape to permit it to act as a cover for the receptacle, said base carrying a closure member movable into a position to act as a stopper when the base is functioning as a cover.

8. In a container of the class described, a hollow frustro-conical base having a tubular upper end, a strainer interiorly disposed transversely of the base, a fruit squeezer carried inside the base below the strainer, a tubular stopper member concealed inside the base above the strainer, a cup shaped receptacle detachably carried by the upper end of the base, said stopper member being removable from the base, the base when detached from the bottom of the receptacle being capable of being attached to the top of the receptacle to act as a cover therefor, the stopper member being attachable to the top of said cover to act as a closure therefor or as a pouring spout.

9. The combination in a beverage shaker, of a cup shaped receptacle normally open at the top, of a detachable base which may function as a cover for the receptacle, said base carrying and concealing a strainer and a hollow stopper member which may be placed on the top of the cover to act as a pouring spout.

10. A loving cup or the like, convertible into a beverage shaker, and having a detachable base, said detachable base so proportioned as to be capable of use as the cover for the shaker and having a strainer and pouring spout concealed when acting as a base.

11. In combination, a cup shaped liquid receptacle having a short tubular skirt extending from the lower end thereof, a base member having an upper tubular end, telescopically associated with the skirt, the base member extending outwardly and downwardly from it, the bottom of the base member being of such size as to fit the top of the receptacle so that it may act as a cover for the receptacle.

12. A loving cup, convertible into a beverage shaker, having a base, and having a fruit squeezer and pouring spout concealed in the base when the parts are in the position to make the device appear as a loving cup, the base being detachable and adapted to act as a cover for the loving cup to transform it into a beverage shaker.

13. In a container of the class described, a cup shaped receptacle, a dome shaped cover carrying a pouring spout and a combined fruit juice extractor and strainer inside thereof, the cover being capable of being inverted and carried inside the receptacle and supported from the upper edge of the receptacle so that fruit may be squeezed against the fruit juice extractor when the cover is inverted and the juice may be strained into the receptacle, said strainer also acting to prevent the escape of solid materials when the contents of the container are poured out of the pouring spout, when the cover is in place on the top of the receptacle.

14. In a container of the class described, a cup shaped receptacle, a receptacle cover extending a substantial distance above the top of the receptacle, a pouring spout carried by the cover, said cover being capable of being inverted and placed partly inside the receptacle and having a flange to engage with the top of the receptacle and support the inverted cover thereon, and a combined fruit juice extractor and strainer placed across the inside of the cover so that fruit may be squeezed against it when the cover is inverted and the juice strained into the receptacle, said strainer also acting to prevent the escape of solid materials when the contents of the container are poured out of the pouring spout, when the cover is in place on the top of the receptacle.

WILLIAM L. BASS.